United States Patent [19]

Ehrmann et al.

[11] 3,905,990

[45] Sept. 16, 1975

[54] BASICALLY SUBSTITUTED BENZIMIDAZOLE DERIVATIVES

[75] Inventors: Oskar Ehrmann, Mannheim; Frank Zimmermann, Neustadt; Ludwig Friedrich, Mannheim, all of Germany

[73] Assignee: Knoll A.G. Chemische Fabriken, Ludwigshafen (Rhine), Germany

[22] Filed: Dec. 12, 1973

[21] Appl. No.: 424,120

[30] Foreign Application Priority Data

Jan. 2, 1973    Germany............................ 2300018

[52] U.S. Cl............................... 260/309.2; 424/273
[51] Int. Cl.$^2$...................................... C07D 235/04
[58] Field of Search................................ 260/309.2

[56] References Cited
UNITED STATES PATENTS 3,686,206    8/1972    Posselt et al.................... 260/310 R

OTHER PUBLICATIONS

Shaps et al., Khim. Farm. Zh. 4 (11), 11–14 (1970).

*Primary Examiner*—G. Thomas Todd
*Attorney, Agent, or Firm*—Curtis, Morris & Safford

[57] ABSTRACT

1-[N-methyl-N-(β-phenylethyl)-3-aminopropyl]benzimidazole and derivatives thereof substituted in the phenyl ring by hydroxy, lower alkyl, lower alkoxy or chlorine and methods for their preparation are disclosed. The compounds have bronchospasmolytic, antiallergic and histaminolytic activity.

14 Claims, No Drawings

BASICALLY SUBSTITUTED BENZIMIDAZOLE DERIVATIVES

The present invention relates to basically substituted benzimidazole derivatives, methods of preparing these derivatives and pharmaceutical compositions containing such derivatives It is known that certain basically substituted xanthin derivatives possess valuable pharmacological properties. For example, the coronary dilatatory and blood pressure-reducing effect of 1-[N-methyl-N-(3′,4′-dimethoxybenzyl)-β-aminoethyl]-theobromine has already been described.

It has now been found that compounds of the formula

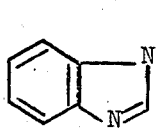 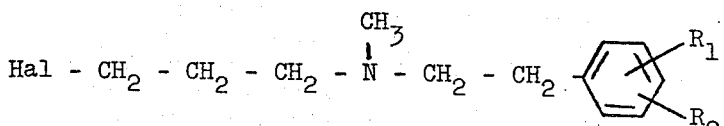 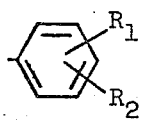

wherein $R_1$ represents hydrogen, chlorine, hydroxyl, lower alkyl or lower alkoxy and $R_2$ represents a hydrogen, chlorine or lower alkoxy, as well as the salts of these compounds with physiologically acceptable acids, e.g., hydrochloric acid, sulfuric acid, phosphoric acid, acetic acid, malonic acid, succinic acid, fumaric acid and citric acid, have desirable bronchospasmolytic and antiallergic properties and broad histaminolytic effect.

The terms "lower alkyl" and "lower alkoxy" are intended to means alkyl and alkoxy groups of 1 to 4 carbon atoms.

The compounds of the invention are prepared by reacting benzimidazole with an aminoalkyl halide of the formula

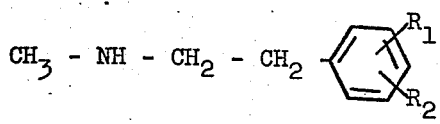 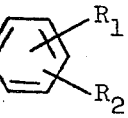    II wherein Hal represents halogen and $R_1$ and $R_2$ are as defined previously, in the presence of a hydrogen halide bonding agent.

Alternatively, the compounds may be prepared by condensing 1-(3-halogenopropyl)benzimidazole with a nuclear substituted N-methyl-β-phenylethylamine of the formula

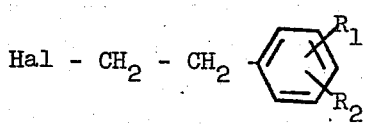    III

The compounds may also be prepared by reacting 1-(3-methylaminopropyl)benzimidazole with a nuclear substitute β-phenylethyl halide of the formula

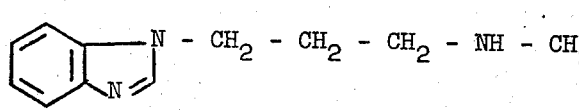    IV

As a still further alternative, the compounds may be prepared by methylating a secondary amine of the formula on the basic nitrogen atom in a known manner.

The compounds in which $R_1$ and/or $R_2$ represent hydroxyl groups may also be prepared by ether cleavage of the appropriate compounds.

It is preferable to carry out the first of these methods either in an alcoholic solution using an alkaline alcoholate as the condensation means or in an aqueous alcoholic solution of caustic soda, the reactants being heated, with agitation for a period of time under reflux. It has also proved to be particularly advantageous to stir a refluxing suspension of benzimidazole, dry potassium carbonate and a compound of the formula II in an inert solvent such as acetone or butanone.

In the case of the second method, it has proved advantageous to utilize two mols of the base III per mol of starting benzimidazole, the second mol acting as a hydrogen halide bonding agent. It is preferable to heat the mixture of the two reactants for a period of several hours on an oil bath at a temperature of 140°C. If a suitable solvent, such as toluene or xylene is then added to the hot mixture, 1 mol of the hydrogen halide salt of base III separates out in a crystalline form and can be filtered off. The filtrate then contains the reaction product of the process. It is also possible to carry out the reaction in boiling xylene or, in the case of a reactive halogen, in toluene. In such a case, it is possible to use dry potassium carbonate or a tertiary base such as pyridine or triethylamine as the acid bonding agent, instead of an additional mol of base III. The same reaction conditions apply to the third method.

The introduction of the methyl group into a secondary base of formula V to form the compounds of the present invention can be effected by treating the secondary base with a methyl halide or dimethyl sulfate, further by boiling the base with formalin or paraformaldehyde and formic acid. Methylation can also be effected by shaking an alcoholic solution of the secondary base V mixed with formaldehyde, with hydrogen in the presence of palladium or nickel catalysts or treating with an aluminum amalgam or sodium borohydride or any other suitable reduction agent.

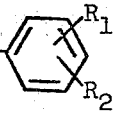 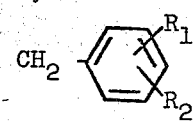 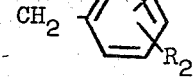    V

In order to obtain the products of the present invention which have free phenolic hydroxyl groups, the corresponding compounds which contain an alkoxy, benzyloxy, benzylcarboxy or a methylene dioxy group are treated, at elevated temperature, with an aqueous hydrogen halide acid. If necessary, in order to improve solubility, a suitable solvent such as glacial acetic acid or acetic anhydride may be added. If hydrochloric acid is employed as the demethylating agent, it is often necessary to apply pressure while heating. If benzyloxy or benzylcarboxy compounds are used as starting materials, these may be converted into the phenolic compounds according to the present invention by hydrogenation with palladium catalysts.

Another alternative method of preparing the compounds involves the use of a bound hydrogen halide acid in the form of a salt, such as pyridine hydrochloride. This is carried out by melting the reactants together at high temperature, if necessary, using a suitable solvent such as glacial acetic acid or acetic anhydride.

The ether cleavage may also be carried out by using an organic acid halide either in the presence of absence of a catalyst. The rate of reaction increases in the sequence:— acid chloride — acid bromide — acid iodide. A metallic and/or non-metallic halide may be used as the catalyst. Zinc chloride, stannic (IV) chloride and boron trifluoride are particularly suitable.

Alternatively, electrophilic metallic halides such as aluminum chloride or bromide may be used.

The new compounds have bronchospasmolytic and antiallergic properties and possess a broad histaminolytic effect which can be utilized against endogenic (anaphylactic) and exogenic histamine reactions. These properties mean that the compounds are valuable curative agents in the treatment of a large number of diseases such as bronchial asthma, urticaria, hay fever, skin afflictions and allergies.

The present invention therefore also relates to pharmaceutical compositions comprising effective amounts of such compounds in association with a pharmaceutically acceptable carrier.

The histaminolytic effectiveness of the compounds was determined by the method of H. Konzett and R. Roessler, [Arch. exp. Path.Pharm.195, 71 (1940)] on the bronchospasm of a guinea pig. In Table I, in column A, the dose ($ED_{50}$) is given which reduces the initial value of the bronchospasm by one-half.

The new compounds also show a strong histaminolytic effect on the isolated ileum of the guinea pig, in accordance with the method of Magnus [R. Pfluegers Arch.ges.Physiol. 102, 123 (1904)]. In column B of Table I, the concentration is given, in µg/ml bath liquid, which causes a complete suppression of the initial spasm.

For therapeutic application, the new substances may be utilised in the form of ampoules, tablets, pills and inhalants. The dosage is 0.1 to 1.0 mg/kg orally, or 0.01 to 0.1 mg/kg parenterally, perday.

| $R_1$ | $R_2$ | EXAMPLE | A mg/kg i.v. | B µg/ml |
|---|---|---|---|---|
| 3 - $OCH_3$ | 4 - $OCH_3$ | 5 | 0,09 | 5,0 |
| 3 - $OC_2H_5$ | 4 - $OC_2H_5$ | 6 | 1,0 | 10,0 |
| 4 - Cl | H | 4 | 0,07 | 0,1 |
| 2 - Cl | 6 - Cl | 3 | >10,0 | 5,0 |
| 2 - Cl | 4 - Cl | 2 | 0,35 | 0,5 |
| 3 - Cl | 4 - Cl | 1, 11 | 0,05 | 0,1 |
| 3 - Cl | 5 - Cl | 7 | 2,5 | 10,0 |
| 3 - Cl | 4 - $OCH_3$ | 8 | 0,25 | 0,5 |
| Theophylline (Comparison substance) | | | 3,0 | >100,0 |
| Bamiphylline (Comparison substance) | | | >10,0 | >100,0 |
| Cinnarizine (Comparison substance) | | | 0,45 | 5,0 |

The preparation of some of the reactants required for the preparation of the new compounds have not hitherto been described.

The aminoalkyl halides of general formula II may be obtained by condensation of the nuclear substituted β - phenyl ethylamines with 3-chloropropanol. The resultant secondary aminoalcohols are then methylated in the normal manner, for example by means of formaldehyde and formic acid, on the nitrogen atom. The alcoholic hydroxyl group is converted into a chlorine atom by treatment with thionyl chloride. If, instead of β - phenyl ethylamines, their N-monomethyl-derivatives (general formula III) are used, the tertiary aminoalcohols are obtained in a single stage and methylation on the nitrogen atom is unnecessary.

The compounds of formula III may be prepared in various ways. For example, nuclear-substituted benzenes can usually be converted into the corresponding benzyl chlorides by chloromethylation using formaldehyde and hydrochloric acid. The benzyl chlorides may also be produced from aromatic carboxylic acids, or esters thereof, by reduction with lithium aluminium hydride or by reducing nuclear substituted aldehydes by catalytic hydrogenation or treatment with suitable reducing agents and subsequently chlorinating the benzyl alcohols thus produced. Alternatively the corresponding benzyl cyanides, may be more readily obtained from the benzyl chlorides, for example, by reaction with alkali metal cyanides in the presence of aqueous ethanol, dimethyl formamide or dimethyl sulphoxide. The β-phenyl ethylamines are then obtained by catalytic hydrogenation of the cyanides. The amines of general formula III are then obtained from the primary β-phenyl ethylamines by treatment of their benzyl derivatives with dimethyl sulphate or iodomethane or by reduction of their N-formyl derivatives with lithium aluminum hydride.

The compounds of formula IV may be obtained from the above-described nuclear-substituted benzyl cyanides. These are saponified to form the phenyl acetic acids which, upon reduction with lithium aluminum hydride yield β-phenyl ethanols. These latter are converted into the compounds of general formula IV by reacting with for example thionyl chloride.

The compounds of formula V may be obtained in various ways. They may, for example, be prepared from

TABLE

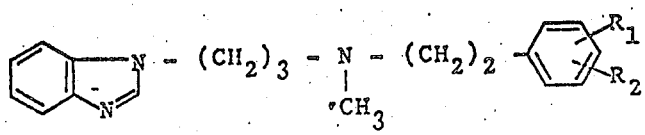

nuclear-substituted β-phenyl ehtylamines by reaction with 1(3-halogenopropyl) benzimidazole.

The invention will be further described with reference to the following non-limitative Examples, in which the melting points are corrected values.

EXAMPLE 1.

1-[N-methyl N-(β-3,4-dichlorophenylethyl) 3-aminopropyl] benzimidazole

A. Preparation of the starting materials.

I. N-methyl β-3,4-dichlorophenylethylamine.

A solution of β-3,4-dichlorophenyl ethylamine (41.2g; 0.217 mol)[F. Senington et al.J.Org.Chem. 25 (1960), 2066] is mixed with formic acid (11.8g; 1.2 × 0.217 mol) and boiled under reflux for 4 hours using a water separator. 8.4 ml water are removed. The toluene is then evaporated, the residue distilled in vacuo and 41.0g of the N-formyl derivative are obtained. This represents 90% of the theoretical yield and has a boiling point of 168° to 171°C/0.02 Torr. These 41.0g (0.188 mol) of the resultant N-formyl compound are dissolved in tetrahydrofuran (200ml) and added dropwise, with stirring, to a boiling suspension, in a three-necked flask, of lithium aluminum hydride (11g; 2 × 0.75 × 0.188 mol) in tetrahydrofuran (200 ml). The mixture is kept boiling for a further four hours and then decomposed by the dropwise addition of water and caustic soda. The mixture is then filtered under suction to remove the aluminum hydroxide, the filtrate concentrated by evaporation, the residue thereof dissolved in hydrochloric acid (IN) and stirred with toluene. The aqueous solution is then mixed with concentrated caustic soda, the base taken up in toluene, the solvent evaporated and the residue distilled in vacuo. At 96° to 97°/0.3 torr, N-methyl β-3,4-dichlorophenyl ethylamine (32.3g representing 86% of the theoretical yield) and having a $n_D^{25}$ of 1.5489 distills over. The hydrochloride, recrystallised from alcohol and ether, melts at 197° to 200°C.

II. N-methyl N-(β-3,4-dichlorophenylethyl) 3-aminochloropropane

N-methyl β-3,4 dichlorophenyl ethylamine (133.5g; 2×0.328 mol) and 3-chloropropanol (31g; 0.328 mol) in toluene are boiled under reflux, with agitation, for 24 hours. After separating out the precipitated N-methylβ-3,4-dichlorophenyl ethylamine hydrochloride, the solvent is evaporated and N-methyl N-(3-hydroxypropyl)β-3,4 dichlorophenyl ethylamine remains as an oil. This is taken up in chloroform and added dropwise to thionyl chloride (43.0g; 1.1 × 0.328 mol). The mixture is boiled for 2 hours under reflux. After evaporating the chloroform, the reaction product is taken up in hot acetone. During cooling thereof, the hydrochloride of N-methyl N-(β-3,4-dichlorophenylethyl) 3-aminochloropropane is precipitated, having a melting point of 145° to 146° C. The yield is 73.9g. which is 76.2% of theoretical yield. The free base boils at 112° to 116° /0.2 torr. The refractive index ($n_D^{25}$) is 1.5392.

B. Preparation of the end product

N-methyl N- (β-3,4-dichlorophenylethyl) 3-aminopropane hydrochloride (168g; 0.53 mol) is converted into its free base, which is then dissolved in toluene, (100 ml) and added dropwise, within 30 minutes to a mixture, boiling under reflux, of isopropanol (250 ml), sodium hydroxide (21.4g, 0.53 mol), water (30 ml) and benzimidazole (63g, 0.53 mol). The reaction mixture is boiled for a further three hours under reflux.

The mixture is then filtered under suction to remove the sodium chloride and the filtrate is evaporated. The oily residue therefrom is then dissolved in toluene. Hydrogen chloride gas is introduced into the toluene solution until a strong acid reaction occurs. 1-[N-methyl N-(β-3,4-dichlorophenylethyl) 3-aminopropyl] benzimidazole-hydrochloride separates out as a white, crystalline powder. After evaporating the solvent and recrystallisation from isopropanol, 187g (81% of the theoretical yield) of the salt is obtained, having a melting point of 142° to 144°C.

The condensation of benzimidazole with N-methyl N-(β-3,4-dichlorophenylethyl) 3-aminopropane may also be carried out using dry potassium carbonate in acetone or butanone as the hydrogen halide bonding agent.

EXAMPLE 2

1-[N-Methyl N-(β-2,4-dichlorophenylethyl) 3-aminopropyl]-benzimidazole

A. Preparation of the starting materials.

I. N-methylβ-2,4-dichlorophenyl ethylamine

This compound is obtained from β-2,4-dichlorophenyl ethylamine [W. N. Cannon et al., J. Org. Chem. 22 (1957) 1323] by reduction of its N-formyl derivative with lithium aluminium hydride. The hydrochloride melts at 183° to 185° C.

II. N-methyl N-(β-2,4-dichlorophenylethyl) 3-aminochloropropane

This compound is obtained in an analagous manner to that described in Example 1. (A) II from N-methyl β-2,4-dichloro phenyl ethylamine by condensation thereof with 3-chloropropanol and subsequent treatment of the aminoalcohol with thionyl chloride. Its dioxalate melts at 152° to 154°C.

B. Preparation of the end product

N-methyl N-(β-2,4-dichlorophenylethyl) 3-aminochloropropane hydrochloride (66.6g, 0.21 mol) and benzimidazol (25g, 0.21 mol) are condensed together and worked up in a manner similar to that described in Example 1. The base is purified by conversion into the maleate which, after recrystallisation from isopropanol, melts at 112° to 114°C. The yield is 74g, which is 59% of the theoretical yield.

EXAMPLE 3

1-[N-Methyl N-(β-2,6-dichlorophenylethyl) 3-aminopropyl] benzimidazole

A. Preparation of the starting materials

I. N-Methyl β-2,6-dichlorophenyl ethylamine

This compound is prepared by reduction of the N-formyl derivative of β-dichlorophenyl ethylamine [J. Augstein et al., J.Med.Chem. 10 (1967) 399] with lithium aluminium hydride as described in Example 1 (A) I. The hydrochloride of this compound melts at 171° to 174°C.

II. N-Methyl N-(β-2,6-dichlorophenylethyl) 3-aminochloropropane

This compound is obtained in a manner analogous to that described in Example 1 (A) II by condensing N-methyl β-2,6-dichlorophenyl ethylamine with chloropropanol and subsequently treating the aminoalcohol with thionyl chloride. The hydrochloride of this compound melts at 158° to 170°C.

B. Preparation of the end product

N-methyl N-(β-2,6-dichlorophenylethyl) 3-aminochloropropane hydrochloride (182.5g, 0.576 mol) and benzimidazole (68g, 0.576 mol) are condensed together and worked up as described in Example 1.

169g, representing 67.4% of theoretical yield, of the hydrochloride are obtained when recrystallised from isopropanol, this compound melts at 220° to 223° C.

EXAMPLE 4

1-[N-Methyl N-(β-4-chlorophenylethyl) 3-aminopropyl] benzimidazole

N-methyl N-(β-4-chlorophenylethyl) 3-aminochloropropane hydrochloride (148g, 0.52 mol) and benzimidazole (62g, 0.525 mol) are condensed together and worked up as described in Example 1. The resultant base is converted into the maleate and recrystallised from acetone.

218.5g, representing 75.5% of the theoretical yield of the salt are obtained, which melts at 122° to 124° C.

EXAMPLE 5

1-[N-Methyl N-(β-3,4-dimethoxyphenylethyl) 3-aminopropyl] benzimidazole

N-Methyl N-(β-3,4-dimethoxyphenylethyl) 3-aminochloropropane hydrochloride (78.6g, 0.255 mol) is condensed with benzimidazol (30g, 0.255 mol) and worked up. The base obtained is dissolved in toluene. Hydrogen chloride gas is then introduced into this toluene solution, whereupon the hydrochloride separates out as a white crystalline powder. After recrystallisation from ethanol, the hydrochloride melts at 120° to 122° C. A yield of 67.7 g, representing 62.3% of the theoretical yield, is obtained.

EXAMPLE 6

1-[N-Methyl N-(β-3,4-diethoxyphenylethyl) 3-aminopropyl] benzimidazole

N-Methyl N-(β-3,4-diethoxyphenylethyl) 3-aminochloropropane hydrochloride (47.4g, 0.141 mol) and benzimidazole (16.5g, 0.141 mol) are condensed together and worked up as described in Example 1. Hydrogen chloride gas is introduced into a toluene solution of the base thus formed, the hydrochloride separating out as a white crystalline powder. After recrystallisation from ethanol, the hydrochloride melts at 210° to 212°C. The yield is 42.9g, which is 67.4% of the theoretical yield.

EXAMPLE 7

1-[N-Methyl N-(β-3,5-dichlorphenylethyl) 3-aminopropyl] benzimidazole

A. Preparation of the starting material

I. 1-(3-hydroxypropyl) benzimidazole-sodium hydroxide (34g, 0.847 mol) in water (35 ml) is added to benzimidazole (100g, 0.847 mol) in isopropanol (400 ml) and boiled under reflux for 1 hour. 1-chloropropanol-3 (80g, 0.847 mol) is then added dropwise to the clear solution thus obtained, within 30 minutes. The mixture is then boiled under reflux for a further 3½ hours. After cooling the reaction mixture, sodium chloride separates out and is filtered off. The solvent is then evaporated and the residue distilled. The product thus obtained is a light yellow oil having a boiling point of 186° to 190° /0.8 torr. The yield is 120.7g, which represents 80.9% of the theoretical yield.

II. 1-(3-chloropropyl) benzimidazole

The above-described 1-(3-hydroxypropyl) benzimidazole (100g, 0.568 mol) is dissolved in chloroform (300 ml) and mixed dropwise with thionyl chloride (135g,1.36 mol) with agitation. The mixture is boiled under reflux for 4 hours. The solvent is then evaporated off and the crystalline residue taken up in hot acetone. After cooling to room temperature, colourless crystals separate out which are recrystallised from acetone.

The 1-(3-chloropropyl) benzimidazole hydrochloride has a melting point of 142° to 145°C and a yield of 90g (68.6% of the theoretical yield) is obtained.

III. β- 3,5-dichlorophenyl ethylamine 3,5-dichlorobenzyl cyanide (46g, 0.3 mol) [M. B. Pybus et al., Ann. Appl. Biol. 47, 593 (1959)] is dissolved in methanol (250 ml) containing ammonia (about 20g) and hydrogenated at 50°/70 atmospheres $H_2$ with Raney Cobalt. The catalyst is then removed, the filtrate evaporated, the residue taken up in hydrochloric acid and non-basic impurities removed by shaking with toluene. The base is re-constituted by addition of caustic soda to the mixture and is then taken up in ether, dried with sodium hydroxide and converted into the hydrochloride by passing hydrogen chloride gas thereinto. After boiling with acetone, the salt melts at 233° to 236°C. The yield amounts to 39 g which is 89% of the theoretical yield.

IV. N-methyl β-3,5-dichlorophenyl ethylamine

The base is regenerated from the above-obtained hydrochloride and converted, as described in Example 1(A) I into its formyl derivative. By reduction of this amide with lithium aluminium hydride, N-methyl β-3,5-dichlorophenyl ethylamine hydrochloride having a melting point of 194° to 197° C is obtained. The yield corresponds to 96% of the theoretical yield calculated with respect to the primary base.

B. Preparation of the end product 1-(3-chloropropyl) benzimidazole hydrochloride (32.8g, 0.142 mol) toluene (200 ml) and triethylamine (28.6g, 0.284 mol) are mixed in a three-necked flask. The mixture is then stirred for 1 hour at room temperature. Thereafter, it is mixed with N-methyl β-3,5-dichlorophenyl ethylamine (29g, 0.142 mol). The reaction mixture is then boiled under reflux for 25 hours. Triethylamine hydrochloride separates out and is filtered off under suction. The filtrate is evaporated in vacuo, the residue dissolved in toluene (200 ml), and hydrogen chloride gas is introduced into the mixture until an acid reaction occurs.

The hydrochloride of the desired product then separates out. After recrystallisation from isopropanol, 36.1g (58.4% of the theoretical yield) is obtained, having a melting point of 208° to 210°C.

N-methyl-β-3,5-dichlorophenyl ethylamine can be used as the acid-bonding agent instead of triethylamine. In such a case, double the stoichiometric quantity of the amine must be used.

EXAMPLE 8

1-[N-Methyl-N-(β-3-chloro-4-methoxy phenylethyl)3-aminopropyl]benzimidazole 1-(3-chloropropyl)benzimidazole hydrochloride (33g, 0,143 mol) and N-methylβ-3-chloro-4-methoxyphenyl ethylamine (28.6g, 0.143 mol) (M. Julia et al., Bull.Soc. Chim.France 1966, 1335) are condensed together with triethylamine as described in Example 7. After filtration the toluene is distilled off.

29.4g (57.6% of the theoretical yield) of an oil is obtained.

The characterisation of the oil is effected by conversion into the dioxolate which melts at 155° to 156° when recrystallised from methanol.

EXAMPLE 9

1-[N-Methyl N-(β-3-methoxy-4-chlorophenylethyl)3-aminopropyl] benzimidazole

A. Preparation of the starting material

I. β-3-Methoxy-4-chlorophenyl ethylamine

3-Methoxy-4-chlorobenzyl cyanide (150g, 0.83 mol) [S. Munavalli et al., Bull. Soc, Chim. Fr. 1966 (10) 3311–18] is dissolved in methanol (600 ml) containing ammonia (50g) and hydrogenated at 50°/70 atmospheres $H_2$ with Raney Cobalt. The base is isolated as its hydrochloride. 202g, which is 91% of the theoretic yield, β-3-methoxy-4-chlorophenyl ethylamine hydrochloride, having a melting point of 164° to 166° C, are obtained.

II. N-Methylβ-3-methoxy-4-chlorophenyl ethylamine

The above-obtained β-3-methoxy-4-chlorophenyl ethylamine hydrochloride (155g, 0.7 mol) is converted into its base and methylated on the nitrogen as described in Example 1(A)I by treatment with formic acid and subsequent reduction of the resultant formamide with lithium aluminium hydride. 147g, which is 89% of theoretical yield, of N-methylβ-3-methoxy-4-chlorophenyl ethylamine hydrochloride having a melting point of 147° to 148° C, are obtained.

B. Preparation of the end product 1-(3-chloropropyl) benzimidazole (44.4g, 0.192 mol) and N-Methylβ -3-methoxy-4-chlorophenyl ethylamine (38.4g, 0.192 mol) are condensed and worked up with triethylamine as described in Example 8. 47,3g, representing 69% of the theoretical yield, of an oil are obtained.

The characterisation of the oil was effected by conversion into the dioxalate which melts at 178° to 179°C when recrystallised from methanol.

EXAMPLE 10

1-[N-Methyl-N-(β-2-chloro-3-methoxy-phenylethyl)3-aminopropyl] benzimidazole

A. Preparation of the starting material

I. 2-Chloro-3-methoxy -benzyl alcohol

2-Chloro 3-methoxy benzoicacid (151g, 0.81 mol) [Gibson J. Chem.Soc.London (1926) 1428] is dissolved in tetrahydrofuran (600 ml) and added dropwise, within 30 minutes to a mixture, boiling under reflux, of lithium aluminium hydride (38g, 1.6 × 0.75 × 0.81 mol) and tetrahydrofuran (2 1). The mixture is boiled for a further 30 minutes and decomposed by the dropwise successive addition of water and soda lye. Aluminium hydroxide separates out and is filtered off under suction and the filtrate is evaporated. 132g representing 95% of the theoretical yield of 2-chloro 3-methoxy benzyl alcohol are obtained in the form of a residue which is a light yellow viscous oil.

II. 2-chloro 3-methoxy benzyl chloride

The above-Obtained 2-chloro 3-methoxy benzyl alcohol (132g, 0.76 mol) is dissolved in toluene (300 ml) and mixed dropwise within 1 hour, with agitation and cooling in ice, to thionyl chloride (100g, 1.1 × 0.76 mol). The solution is then boiled for 1 hour under reflux, the solvent evaporated in vacuo and the residue purified by fractional distillation.

The fraction which distils over between 110° and 120° C/1 torr and having an optical rotation ($n_D{}^{25}$) of 1.5610 is collected, and thus 74g of 2-chloro 3-methoxy benzyl chloride is obtained. This represents 51% of the theoretical yield.

III. 2-chloro 3-methoxy benzyl cyanide

The above-obtained 2-chloro 3-methoxy benzyl chloride (49g, 0.26 mol) is added dropwise to a suspension of sodium cyanide (14g, 1.1 × 0.262 mol) in dimethyl sulphoxide (66 ml) at 30° C within 30 minutes with stirring. The stirring is then continued for 2 hours. The reaction mixture is poured into water (250 ml) and extracted with ether. After drying and evaporation of the combined ether solutions the crude nitrile remains which is purified by vacuum distillation. 36g, representing 77% of the theoretical yield, of 2-chloro-3-methoxy benzyl cyanide having a boiling point of 140° /0.1 torr, are obtained.

IV. β-2-chloro-3-methoxyphenyl ethylamine 36.5g, which represents 98% of theoretical yield of β-2-chloro-3-methoxyphenyl ethylamine hydrochloride having a melting point of 124° to 126°C are obtained by catalytic hydrogenation of the above 2-chloro 3-methoxy benzyl cyanide (36g, 0.2 mol).

V. N-methyl β-2-chloro-3-methoxyphenyl ethylamine

The above-obtained hydrochloride (36.5g, 0.164 mol) is converted into its base. This is converted, as described in Example 1 (A) I, with formic acid into the formamide which is then converted, by reaction with lithium aluminium hydride into N-methyl β-2-chloro 3-methoxyphenyl ethylamine. 24.5g, representing 74% of the theoretical yield having a boiling point of 90° to 95°C/0.3 torr and an optical rotation ($n_D{}^{25}$) of 1.5394 of this compound are obtained. The hydrochloride melts at 192° to 195°C.

B. Preparation of the end product 1-(3-chloropropyl) benzimidazol (33.4g, 0.144 mol) and N-methyl β-2-chloro-4-methoxyphenyl ethylamine (28.9g, 0.144 mol) together and worked up, as described in Example 7, with triethylamine. 40.7g, representing 79.3% of the theoretical yield of an oil are obtained.

Characterisation of the oil was effected by conversion into the dioxolate which melts at 194° to 195°C when recrystallised from methanol.

EXAMPLE 11

1-[N-Methyl N-(β-3,4-dichlorophenylethyl) 3-aminopropyl] benzimidazole

A. Preparation of the starting material

1-[N-(β-3,4-dichlorophenylethyl) 3-aminopropyl] benzimidazole 1-(3-chloropropyl) benzimidazole hydrochloride (30g, 0.129 mol), toluene (200 ml) and triethylamine (26.1g, 0.258 mol) are mixed in a three necked flask. The mixture is stirred for 1 hour at room temperature. β-3,4-dichlorophenyl ethylamine (24.6g, 0.129 mol) is then added to the mixture which is boiled under reflux for 25 hours. Triethylamine hydrochloride separates out and is filtered off. The filtrate is evaporated under reduced pressure. The oily residue is taken up in toluene (200 ml) and hydrogen chloride gas is introduced into the toluene solution until an acid reaction occurs.

Crystals separate out which are recrystallised from ethanol.

32.5g, representing 59.5% of the theoretical yield of 1-[N-(ξ-3,4-dichlorophenylethyl) 3-aminopropyl] benzimidazole hydrochloride having a melting point of 236° to 239°C.

B. Preparation of the end product

1-[N-(β-3,4-dichlorophenylethyl) 3-aminopropyl] benzimidazole (26.1g, 0.75 mol) obtained from the above-described hydrochloride, is dissolved in ethanol (140 ml) and mixed with formic acid (5.5g, 0.12 mol). Aqueous formalin solution (8.36g, 35%, 0.098mol) is then added to this mixture, which is cooled in ice, within 20 minutes and heated for 2 hours under reflux. The residue of the reaction mixture is taken up in dilute hydrochloric acid and shaken with toluene. The base is separated from the aqueous hydrochloric acid solution with soda lye, then taken up in toluene and dried. On passing hydrogen chloride gas into the toluene solution, the 1-[N-methyl N(β-3,4-dichlorophenylethyl) 3-aminopropyl] benzimidazol hydrochloride separates out and is recrystallised from isopropanol. 25.5g, representing 78.2% of the theoretical yield, of the salt is obtained, having a melting point of 142° to 144°C.

EXAMPLE 12

1-[N-Methyl N-(β-3-chloro-4-hydroxyphenylethyl) 3-aminopropyl] benzimidazole

1-[N-methyl N-(β-3-chloro-4-methoxyphenylethyl) 3-aminopropyl] benzimidazole (67.9g, 0.19 mol), prepared as in Example 8, is boiled under reflux for two hours with aqueous hydrobromic acid (175 ml, 48%, S.G 1.5) which correspond to 126 g HBr (1.56 mol). Further hydrobromic acid (85 ml, 48% 0.76 mol) is then added and the boiling continued for 1 hour. The reaction mixture is poured into water (1.5 l), filtered and the filtrate neutralised with soda lye (40%) and cooled in ice. The base separates out as an oil in a yield of 22.0g which represents 33.8% of the theoretical yield.

Characterisation of the oil was effected by conversion into the dioxalate which melts at 199° to 202°C when recrystallised from methanol.

EXAMPLE 13

1-[N-Methyl N-(β-3-hydroxy-4-chloro-phenylethyl) 3-aminopropyl] benzimidazole

In a manner similar to that described in Example 12, 1-[N-methyl N-(β-3-methoxy-4-chloro-phenyl ethyl) 3-aminopropyl] benzimidazole (34.2g, 0.095 mol) prepared as in Example 9, mixed with aqueous hydrobromic acid (129 ml, 48%, S.G. 1.5) is subjected to ether cleavage. 11.4g of an oil, representing 31.6% of the theoretical yield, is obtained.

Characterisation of the oil was effected by conversion into the dioxalate which melts at 160° to 162° C when recrystallised from methanol.

EXAMPLE 14 1-[N-Methyl N-(β-2-chloro-3-hydroxy-phenylethyl) 3-aminopropyl] benzimidazole If 1-[N-methyl N-(β-2-chloro-3-methoxyphenylethyl) 3-aminopropyl] benzimidazole (21g, 0.0587 mol), prepared as in Example 10, is boiled with aqueous hydrobromic acid (79.2 ml, 48%) for 4 hours under reflux and worked up as described in Example 12, 7.6g representing 37.8% of the theoretical yield of an oil are obtained.

Characterisation of the oil was effected by conversion into the dioxalate which melts at 160° to 162° when recrystallised from methanol.

What we claim is:

1. Compound of the formula

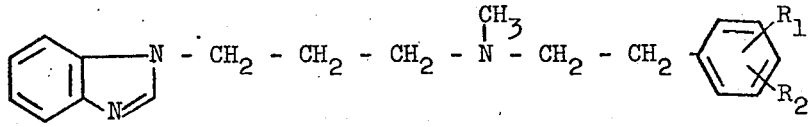

wherein $R_1$ is H, Cl, OH, lower alkyl or lower alkoxy and $R_2$ is H, Cl or lower alkoxy, and salts thereof with physiologically acceptable acids.

2. The compound of claim 1 which is 1-[N-Methyl-N-(β-3,4-dichlorophenylethyl)-3-aminopropyl]-benzimidazole.

3. The compound of claim 1 which is 1-[N-Methyl-N-(β-2,4-dichlorophenylethyl)-3-aminopropyl]-benzimidazole.

4. The compound of claim 1 which is 1-[N-Methyl-N-(β-2,6-dichlorophenylethyl)-3-aminopropyl]-benzimidazole.

5. The compound of claim 1 which is 1-[N-Methyl-N-(β-4-chlorophenylethyl)-3-aminopropyl]-benzimidazole.

6. The compound of claim 1 which is 1-[N-Methyl-N-(β-3,4-dimethoxyphenylethyl)-3-aminopropyl]-benzimidazole.

7. The compound of claim 1 which is 1-[N-Methyl-N-(β-3,4-diethoxyphenylethyl)-3-aminopropyl]-benzimidazole.

8. The compound of claim 1 which is 1-[N-Methyl-N-(β-3,5-dichlorophenylethyl)-3-aminopropyl]-benzimidazole.

9. The compound of claim 1 which is 1-[N-Methyl-N-(β-3-chloro-4-methoxy-phenylethyl)-3-aminopropyl]benzimidazole.

10. The compound of claim 1 which is 1-[N-Methyl-N-(β-3-methoxy-4-chlrophenylethyl)-3-aminopropyl]-benzimidazole.

11. The compound of claim 1 which is 1-[N-Methyl-N-(β-2-chloro-3-methoxyphenylethyl)-3-aminopropyl]benzimidazole.

12. The compound of claim 1 which is 1-[N-Methyl-N-(β-3-chloro-4-hydroxyphenylethyl)-3-aminopropyl]-benzimidazole.

13. The compound of claim 1 which is 1-[N-Methyl-N-(β-3-hydroxy-4-chlorophenylethyl)-3-aminopropyl]-benzimidazole.

14. The compound of claim 1 which is 1-[N-Methyl-N-(β-2-chloro-3-hydroxyphenylethyl)-3-aminopropyl]-benzimidazole.

* * * * *